US008897007B2

(12) United States Patent
Smith et al.

(10) Patent No.: US 8,897,007 B2
(45) Date of Patent: Nov. 25, 2014

(54) GROUNDING FEATURES OF A PORTABLE COMPUTING DEVICE

(71) Applicant: Apple Inc., Cupertino, CA (US)

(72) Inventors: Brandon S. Smith, Mountain View, CA (US); Cheryl P. Espiritu, Cupertino, CA (US); Houtan R. Farahani, San Ramon, CA (US); Charles A. Schwalbach, Menlo Park, CA (US)

( * ) Notice: Subject to any disclaimer, the term of this patent is extended or adjusted under 35 U.S.C. 154(b) by 48 days.

(21) Appl. No.: 13/865,880

(22) Filed: Apr. 18, 2013

(65) Prior Publication Data

US 2014/0111928 A1    Apr. 24, 2014

Related U.S. Application Data

(60) Provisional application No. 61/715,797, filed on Oct. 18, 2012.

(51) Int. Cl.
*H05K 5/00* (2006.01)
*H05K 7/00* (2006.01)
*G06F 1/16* (2006.01)
*H04M 1/00* (2006.01)

(52) U.S. Cl.
CPC ............ *G06F 1/1681* (2013.01); *G06F 1/1616* (2013.01); *G06F 1/1683* (2013.01); *G06F 1/1656* (2013.01)
USPC ............ 361/679.55; 361/679.26; 361/679.27; 361/679.28; 455/575.1; 455/575.3

(58) Field of Classification Search
USPC ............ 361/679.26, 679.27, 679.28, 679.29, 361/679.55; 455/575.1, 575.3
See application file for complete search history.

(56) References Cited

U.S. PATENT DOCUMENTS

| 5,173,837 A | * | 12/1992 | Blackwell et al. ....... 361/679.28 |
| 5,237,486 A | | 8/1993 | LaPointe et al. |
| 5,379,183 A | | 1/1995 | Okonsky et al. |
| 5,491,892 A | * | 2/1996 | Fritz et al. ....................... 29/857 |

(Continued)

FOREIGN PATENT DOCUMENTS

| EP | 1621967 A1 | 2/2006 |
| WO | WO2009126480 A2 | 10/2009 |

(Continued)

OTHER PUBLICATIONS

PCT Application No. PCT/US2013/065128—International Search Report & Written Opinion dated Mar. 10, 2014.

(Continued)

*Primary Examiner* — Anthony Haughton
(74) *Attorney, Agent, or Firm* — Womble Carlyle Sandridge & Rice LLP

(57) ABSTRACT

A portable computing device can include one or more clutch assemblies that can include a conductive elastomer configured to contact at least a portion of the clutch assembly of the portable computing device. The conductive elastomer can be configured to also contact at least one region of the base portion of the portable computing device and can include highly conductive regions. A USB grounding plate can be attached to a portion of a case for the portable computing device and can be configured to provide a ground pathway between the case and a ground sheath of a USB connector inserted into an opening in a side wall of the case.

20 Claims, 11 Drawing Sheets

(56) References Cited

U.S. PATENT DOCUMENTS

| | | | |
|---|---|---|---|
| 6,179,122 B1 | 1/2001 | Moncrief et al. | |
| 6,233,140 B1* | 5/2001 | Cummings et al. | 361/679.55 |
| 6,808,239 B1 | 10/2004 | Bader | |
| 7,733,638 B2* | 6/2010 | Tanaka et al. | 361/679.28 |
| 2002/0048148 A1 | 4/2002 | Horiuchi et al. | |
| 2003/0197111 A1 | 10/2003 | Morimoto et al. | |
| 2004/0203518 A1 | 10/2004 | Zheng et al. | |
| 2006/0082956 A1 | 4/2006 | Garel et al. | |
| 2006/0268528 A1 | 11/2006 | Zadesky et al. | |
| 2007/0052100 A1* | 3/2007 | Bellinger | 257/758 |
| 2007/0146978 A1 | 6/2007 | Nakatani et al. | |
| 2007/0165373 A1 | 7/2007 | Merz et al. | |
| 2007/0285883 A1 | 12/2007 | Nakajima et al. | |
| 2009/0038116 A1 | 2/2009 | Hsu et al. | |
| 2010/0298029 A1 | 11/2010 | Jang | |
| 2010/0323767 A1* | 12/2010 | Tanaka et al. | 455/575.1 |
| 2011/0242756 A1 | 10/2011 | Degner et al. | |
| 2012/0099264 A1* | 4/2012 | Degner et al. | 361/679.09 |
| 2013/0059475 A1 | 3/2013 | Shi et al. | |
| 2013/0329359 A1* | 12/2013 | Andre et al. | 361/679.55 |

FOREIGN PATENT DOCUMENTS

| | | |
|---|---|---|
| WO | WO2011019496 | 2/2011 |
| WO | WO2011047094 A2 | 4/2011 |
| WO | WO2013009596 A2 | 1/2013 |

OTHER PUBLICATIONS

Written Opinion and Search Report for WO 2009/126480A2 dated Oct. 22, 2009.

Written Opinion and Search Report for WO2011047094A2 dated May 10, 2011.

Search Report for WO2013009596A2 dated Dec. 28, 2012.

* cited by examiner

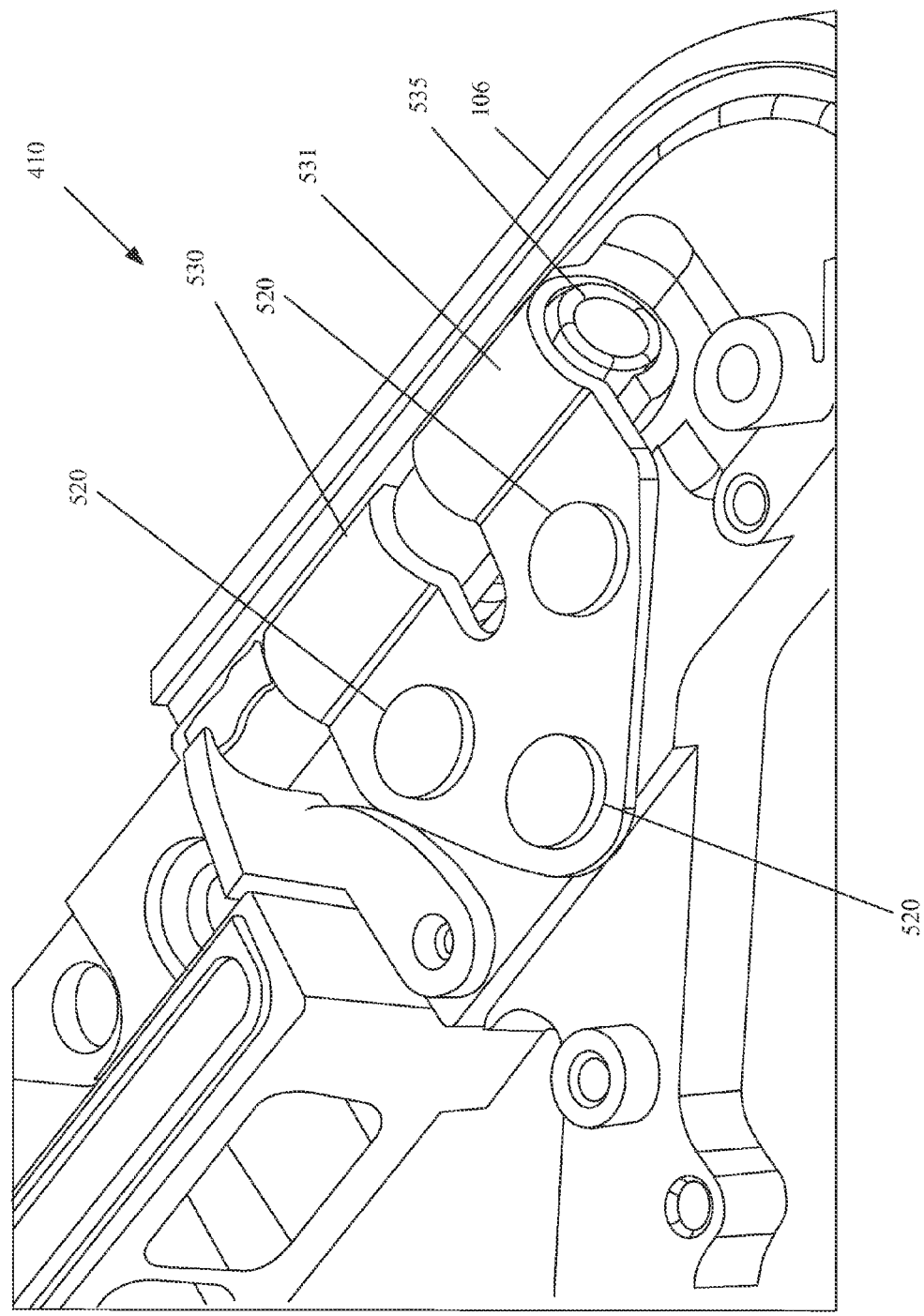

GROUNDING FEATURES OF A PORTABLE COMPUTING DEVICE

CROSS REFERENCE TO RELATED APPLICATIONS

This U.S. Patent Application claims priority under 35 USC 119(e) to U.S. Provisional Patent Application No. 61/715,797 filed Oct. 18, 2012 entitled "Grounding Features of a Portable Computing Device" by Smith et al. which is incorporated by reference in its entirety for all purposes.

TECHNICAL FIELD

The present invention relates generally to portable computing devices. More particularly, the present embodiments relate to features of portable computing devices configured to allow increased electrical shielding by providing or improving electrical pathways.

BACKGROUND

A portable computing device can include an enclosure configured to contain the various components that make up the device. A typical computing device can include a central processing unit, a mass storage device, a display and still other electrical devices. Each electrical device can also generate electrical noise. The emission and conduction of electrical noise (often referred to as electromagnetic radiation, or EMI) is commonly monitored and regulated by regional agencies.

The enclosure of the portable computing device can be a first line of defense in the battle of EMI reduction. If there are any poor electrical couplings between two or more parts that make up the enclosure of the portable computing device, then EMI noise can sometimes more readily escape, especially in those regions.

Therefore, what is needed is a way to reduce unwanted electrical noise from components within a portable computing device, particularly in targeted regions of the enclosure.

SUMMARY

The present application describes various embodiments regarding systems and methods for reducing EMI interference and/or emissions by enhancing an electrical coupling of two or more portions of a base portion of a portable computing device in a region near a clutch assembly. In one embodiment, a clutch assembly can include a cylindrical portion including an annular outer region and a central bore region, a fastening region and an elastomer including a conductive pathway that can be disposed on the clutch assembly and configured to enhance an electrical contact between the clutch assembly and at least one portion of the base portion.

A portable computing device is disclosed. The portable computing device can include a display portion and a base portion pivotally attached to the display portion, where the base portion can include an opening in a side wall configured for a USB connector, a USB receptacle aligned with the opening in the side wall and a USB ground plate mechanically and electrically attached to the base portion configured to contact an electrical sheath of the USB connector.

In another embodiment, a portable computing device can include a rear cover configured to enclose a display, a bottom case and a top case, pivotally coupled to the rear cover and configured to receive the bottom case where the top case can further include at least one boss configured to receive a fastener to secure the bottom case to the top case, the boss including a conductive elastomer configured to form an electrical pathway between the top case and the bottom case.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which:

FIG. 5 is an illustration of a clutch bolt zone in accordance with one embodiment described in the specification.

DETAILED DESCRIPTION

Figure 1:
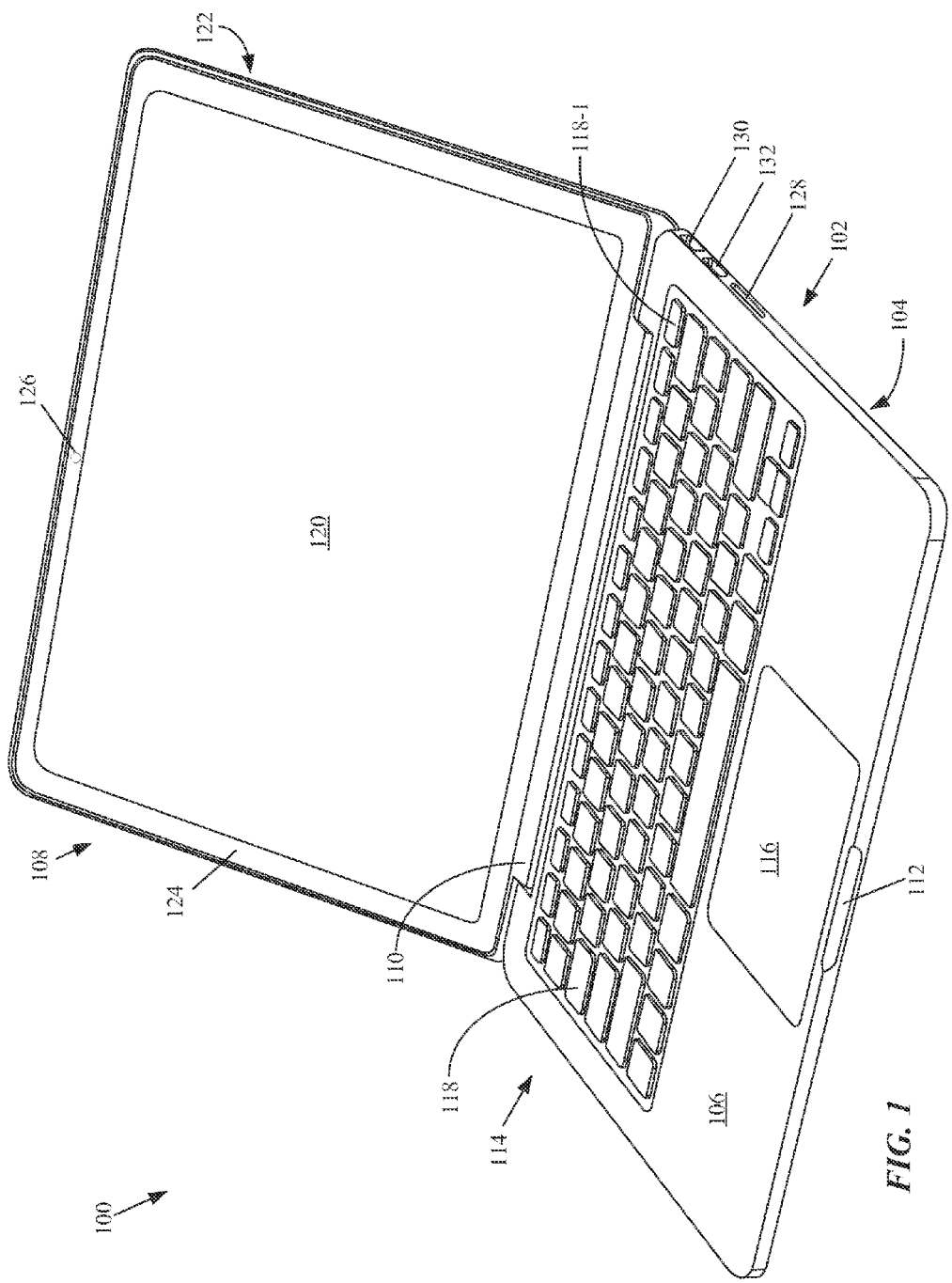
FIG. 1 shows a front facing perspective view of an embodiment of the portable computing device in the form of portable computing device in an open (lid) state.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, netbook computer, tablet computer, etc.

The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

In a particular embodiment, the lid and base portion can be pivotally connected with each other by way of what can be referred to as a clutch assembly. The clutch assembly can be arranged to pivotally couple the base portion to the lid. The clutch assembly can include at least a cylindrical portion that in turn includes an annular outer region, and a central bore region surrounded by the annular outer region, the central bore suitably arranged to provide support for electrical conductors between the base portion and electrical components in the lid. The clutch assembly can also include a plurality of fastening regions that couple the clutch to the base portion and the lid of the portable computing device with at least one of the fastening regions being integrally formed with the cylindrical portion such that space, size and part count are minimized.

The multipart housing can be formed of a strong and durable yet lightweight material. Such materials can include composite materials and or metals such as aluminum. Aluminum has a number of characteristics that make it a good choice for the multipart housing. For example, aluminum is a good electrical conductor that can provide good electrical ground and it can be easily machined and has well known metallurgical characteristics. The superior conductivity of aluminum provides a good chassis ground for internal electrical components arranged to fit and operate within the housing. The aluminum housing also provides a good electromagnetic interference (EMI) shield protecting sensitive electronic components from external electromagnetic radiation as well as reducing electromagnetic radiation emanating from the portable computing device. In one aspect of the provided embodiments, the computing device takes the form of a laptop computer.

The base portion can include a top case and a bottom case formed of conductive material. In one embodiment, the base portion can include a conductive elastomer configured to improve electrical coupling between the top case and the bottom case in at least one region. Improving electrical coupling between the top case and the bottom case can improve EMI shield performance.

These and other embodiments are discussed below with reference to FIGS. 1-11. However, those skilled in the art will readily appreciate that the detailed description given herein with respect to these figures is for explanatory purposes as the invention extends beyond these limited embodiments.

FIGS. 1-11 show various views of the portable computing device in accordance with various embodiments. FIG. 1 shows a front facing perspective view of an embodiment of the portable computing device in the form of portable computing device 100 in an open (lid) state. Portable computing device 100 can include base portion 102 formed of bottom case 104 fastened to top case 106. Base portion 102 can be pivotally connected to lid portion 108 by way of clutch assembly 110 hidden from view by a cosmetic wall. Base portion 102 can have an overall uniform shape sized to accommodate clutch assembly 110 and inset portion 112 suitable for assisting a user in lifting lid portion 108 by, for example, a finger. Top case 106 can be configured to accommodate various user input devices such as keyboard 114 and touchpad 116. Keyboard 114 can include a plurality of low profile keycap assemblies each having an associated key pad 118. In one embodiment, an audio transducer (not shown) can use selected portions of keyboard 114 to output audio signals such as music. In the described embodiment, a microphone can be located at a side portion of top case 106 that can be spaced apart to improve frequency response of an associated audio circuit.

Each of the plurality of key pads 118 can have a symbol imprinted thereon for identifying the key input associated with the particular key pad. Keyboard 114 can be arranged to receive a discrete input at each keypad using a finger motion referred to as a keystroke. In the described embodiment, the symbols on each key pad can be laser etched thereby creating an extremely clean and durable imprint that will not fade under the constant application of keystrokes over the life of portable computing device 100. In order to reduce component count, a keycap assembly can be re-provisioned as a power button. For example, key pad 118-1 can be used as power button 118-1. In this way, the overall number of components in portable computing device 100 can be commensurably reduced.

Touch pad 116 can be configured to receive finger gesturing. A finger gesture can include touch events from more than one finger applied in unison. The gesture can also include a single finger touch event such as a swipe or a tap. The gesture can be sensed by a sensing circuit in touch pad 116 and converted to electrical signals that are passed to a processing unit for evaluation. In this way, portable computing device 100 can be at least partially controlled by touch.

Lid portion 108 can be moved with the aid of clutch assembly 110 from the closed position to remain in the open position and back again. Lid portion 108 can include display 120 and rear cover 122 (shown more clearly in FIG. 2) that can add a cosmetic finish to lid portion 108 and also provide structural support to at least display 120. In the described embodiment, lid portion 108 can include mask (also referred to as display trim) 124 that surrounds display 120. Display trim 124 can be formed of an opaque material such as ink deposited on top of or within a protective layer of display 120. Display trim 124 can enhance the overall appearance of display 120 by hiding operational and structural components as well as focusing attention onto the active area of display 120.

Display 120 can display visual content such as a graphical user interface, still images such as photos as well as video media items such as movies. Display 120 can display images using any appropriate technology such as a liquid crystal display (LCD), OLED, etc. Portable computing device 100 can also include image capture device 126 located on a transparent portion of display trim 124. Image capture device 126 can be configured to capture both still and video images. Lid portion 108 can be formed to have uni-body construction that can provide additional strength and resiliency to lid portion 108 which is particularly important due to the stresses caused by repeated opening and closing. In addition to the increase in strength and resiliency, the uni-body construction of lid portion 108 can reduce overall part count by eliminating separate support features.

Data ports 128-132 can be used to transfer data and/or power between an external circuit(s) and portable computing device 100. Data ports 128-132 can include, for example, input slot 128 that can be used to accept a memory card (such as a FLASH memory card), data ports 130 and 132 can take be used to accommodate data connections such as USB, FireWire, Thunderbolt, and so on. In some embodiments, speaker grid 134 can be used to port audio from an associated audio component enclosed within base portion 102.

Figure 2:
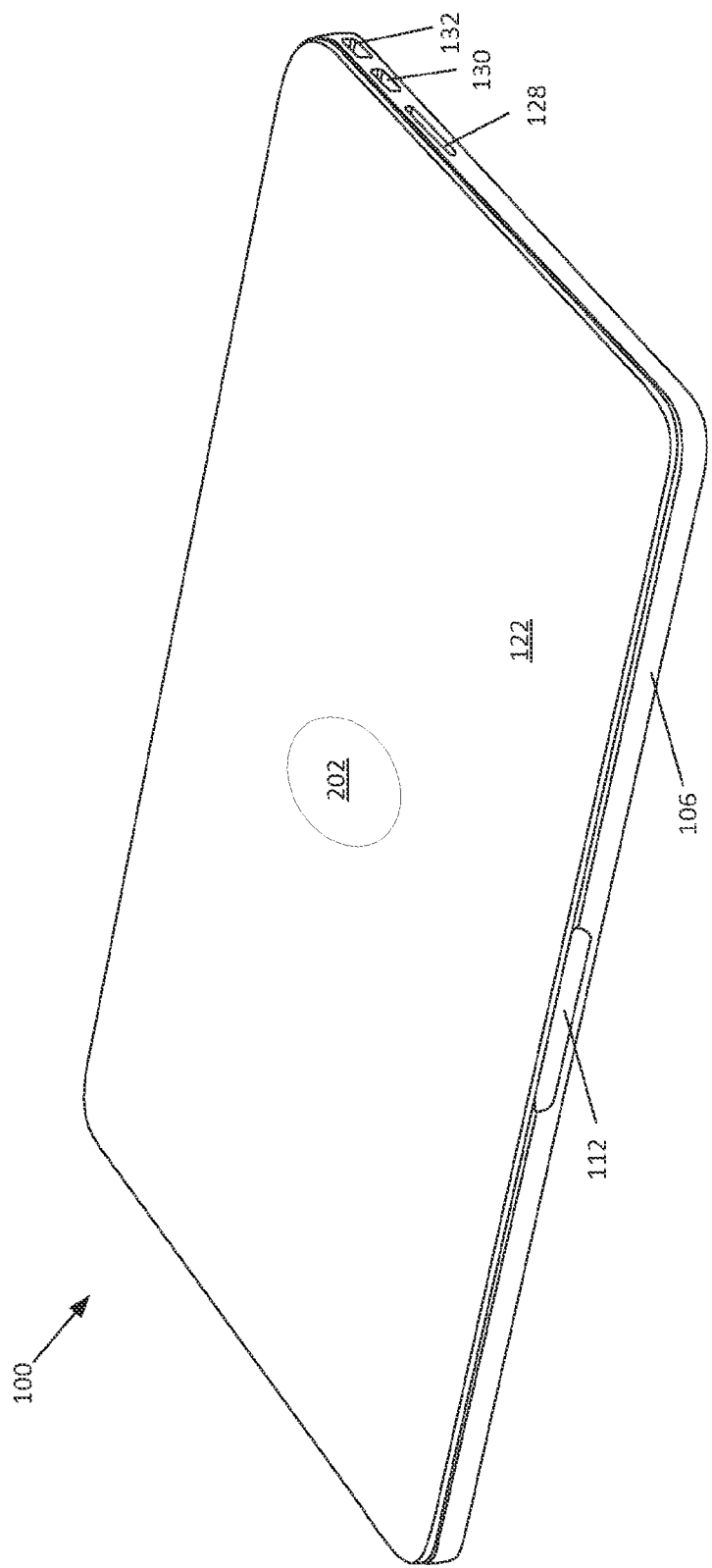
FIG. 2 shows portable computing device in a closed (lid) configuration that shows rear cover and logo.

FIG. 2 shows portable computing device 100 in a closed (lid) configuration that shows rear cover 122 and logo 202. In one embodiment, logo 202 can be illuminated by light from display 120. It should be noted that in the closed configuration, lid portion 108 and base portion 102 form what appears to be a uniform structure having a continuously varying and coherent shape that enhances both the look and feel of portable computing device 100.

Figure 3:
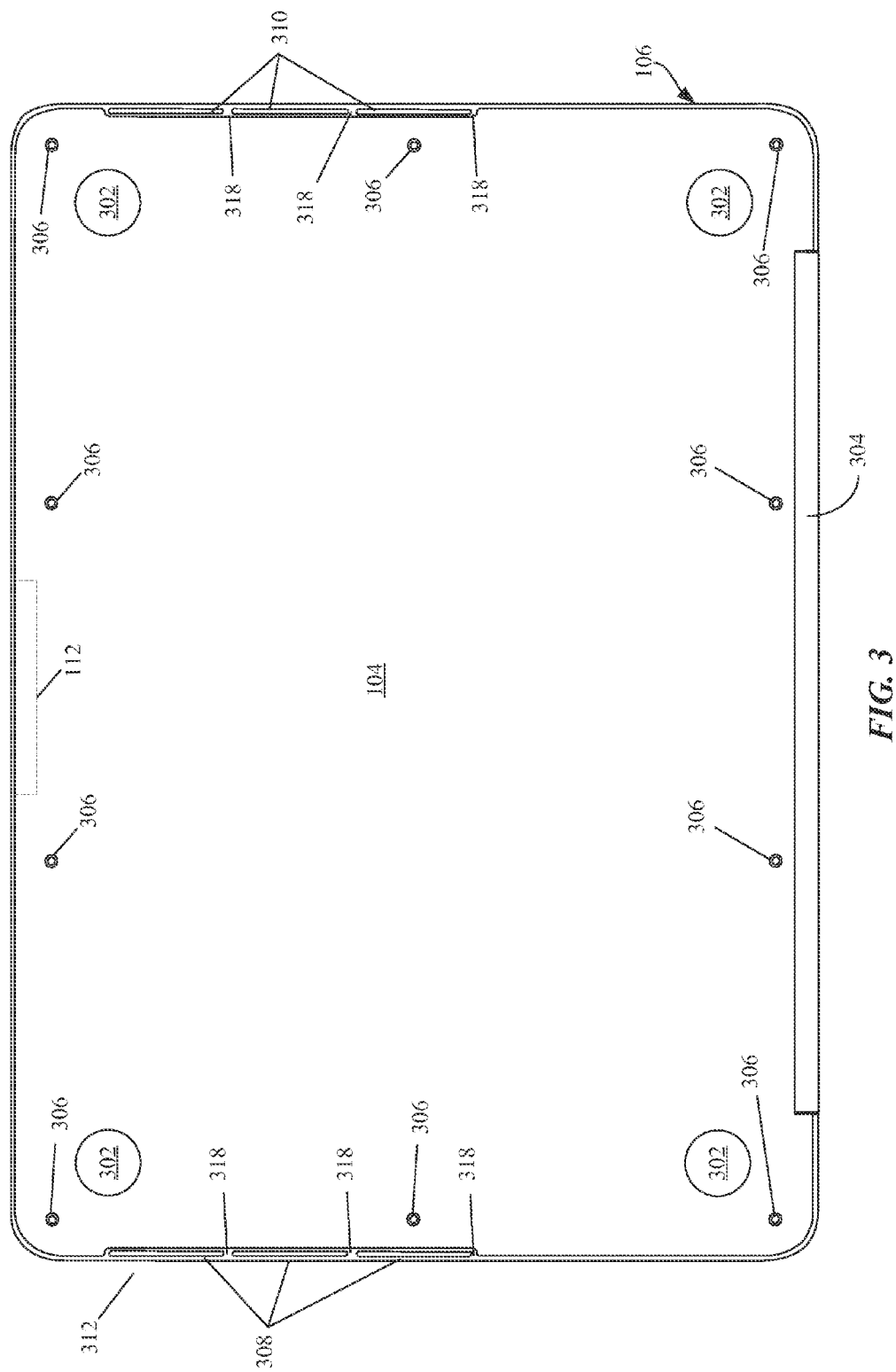
FIG. 3 shows an external view of a bottom case.

FIG. 3 shows an external view of bottom case 104 showing relative positioning of support feet 302, insert 112, cosmetic wall 304 that can be used to conceal clutch assembly 110 and fasteners 306 used to secure bottom case 104 and top case 106 together. Support feet 302 can be formed of wear resistant and resilient material such as plastic. Also in view are multi-purpose front side sequentially placed vents 308 and 310 that can be used to provide a flow of outside air that can be used to cool internal components. In the described embodiment, vents 308 and 310 can be placed on an underside of top case 106 in order to hide the vents from view as well as obscure the view of an interior of portable computing device 100 from the outside. Vents 308 and 310 can act as a secondary air intake subordinate to primary air intake vents located at a rear portion of portable computing device 100 (described below). In this way, vents 308 and 310 can help to maintain an adequate supply of cool air in those situations where portions of the rear vents are blocked or otherwise have their air intake restricted.

Vents 308 and 310 can also be used to output audio signals in the form of sound generated by an audio module (not shown). Vents 308 and 310 can be part of an integrated support system in that vents 308 and 310 can be machined from the outside and cut from the inside during fabrication of top case 106. As part of the machining of vents 308 and 310, stiffener ribs can be placed within vent openings 308 and 310 to provide additional structural support for portable computing device 100.

Moreover, trusses 318 can be formed between vents 308 and 310 in combination with ribs 316 can add both structural support as well as assist in defining both the cadence and size of vents 308 and 310. The cadence and size of vents 308 and 310 can be used to control air flow into portable computing device 100 as well as emission of RF energy in the form of EMI from portable computing device 100. Accordingly, stiffener ribs can separate an area within vents 308 and 310 to produce an aperture sized to prevent passage of RF energy. As well known in the art, the size of an aperture can restrict the emission of RF energy having a wavelength that can be "trapped" by the aperture. In this case, the size of vents 308 and 310 is such that a substantial portion of RF energy emitted by internal components can be trapped within portable computing device 100. Furthermore, by placing vents 308 and 310 at a downward facing surface of top case 106, the aesthetics of portable computing device 100 can be enhanced since views of internal components from an external observer are eliminated.

Figure 4:
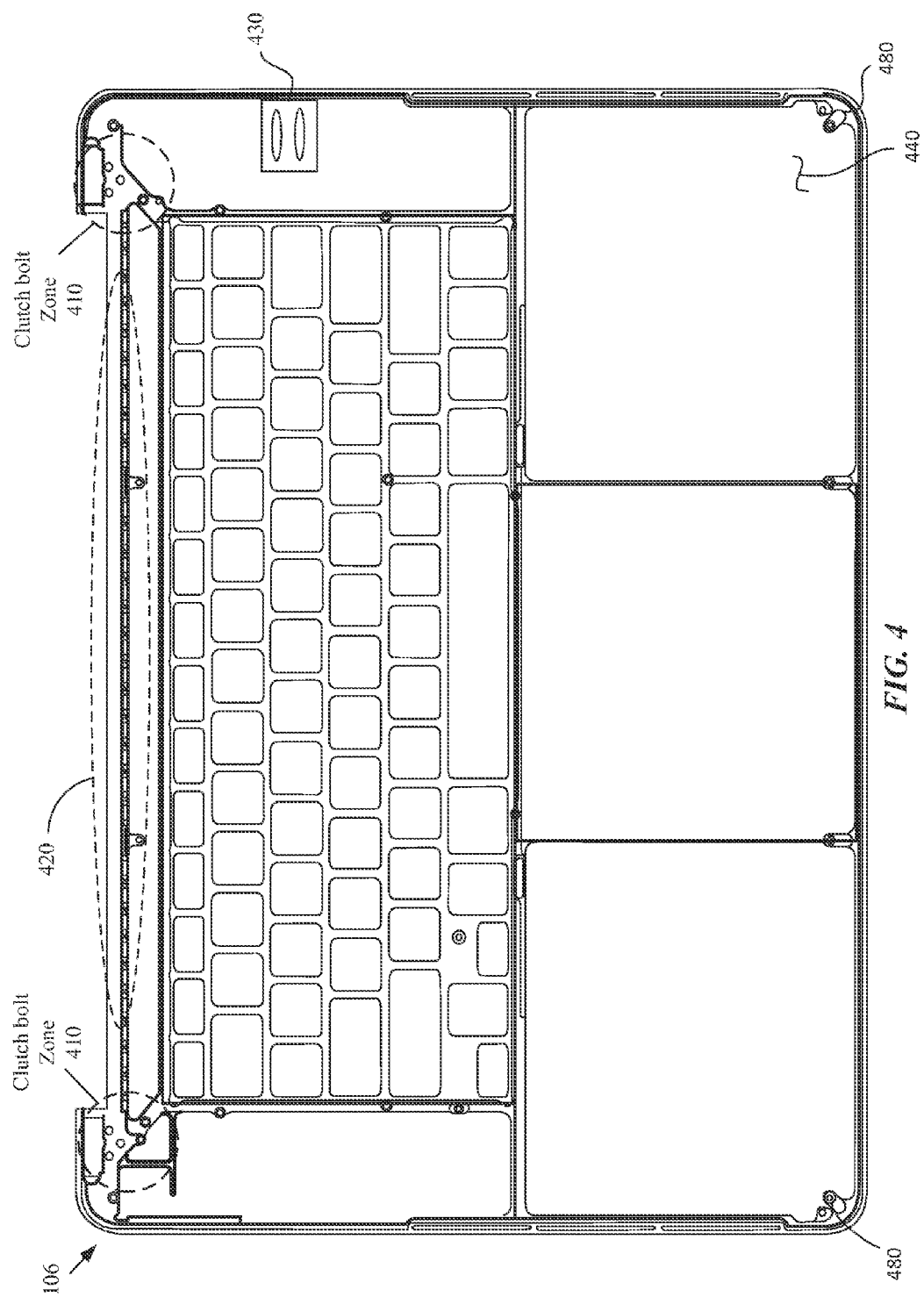
FIG. 4 shows an internal view of a top case with internal components removed to simplify the figure.

FIG. 4 shows an internal view 400 of top case 106 with internal components removed to simplify the figure. Top case 106 can include bosses 480 that can be configured to receive fasteners 306 that, in turn, can attach bottom case 104 to top case 106. Top case 106 can include clutch bolt zone 410. The clutch bolt zone 410 can be configured to receive clutch mounting bolts that enable the display 120 to be pivotably attached to top case 106. In one embodiment, the clutch bolt zone 410 can be configured to provide improved grounding between the top case 106 and the bottom case 104. This is described in greater detail in conjunction with FIGS. 5 and 6A-6B. Top case 106 can also include rear vent region 420. In one embodiment, rear vent region 420 can receive a conductive gasket that can improve grounding between top case 106 and bottom case 104. This is described in greater detail in conjunction with FIG. 7. Top case 106 can also include support for a universal serial bus (USB) connector and a USB ground plate 430. This is described in greater detail in FIGS. 8A-8C and 9. Top case 106 can include speakers located in speaker area 440 for providing audio signals to the user. Elements of the speaker and top case 106 can be configured to provide an improved grounding path between top case 106 and bottom case 104 and are described in greater detail in conjunction with FIGS. 10-11.

FIG. 5 is an illustration of clutch bolt zone 410 accordance with one embodiment described in the specification. Clutch bolt zone 410 shows an exemplary clutch assembly 530 affixed to top case 106 with screws 520. In other embodiments, clutch assembly 530 can be attached with rivets, other fasteners, adhesives or clutch assembly 530 can be welded to top case 106. In some embodiments, electrical noise can be present in top case 106 near clutch assembly 530. Electrical noise can be attenuated, at least to some degree, by forming a shield (such as a Faraday cage) in an area near clutch assembly 530. In one embodiment, clutch assembly 530 can include an annular outer region 531 and a central bore region 535. In one embodiment, wires can be routed through central bore region 535 from components in the top case to the display 120. Top case 106 and bottom case 104 can form a shield when the top case 106 and bottom case 104 are made from conductive material or the case material made conductive through conductive paints or liners. Additionally, top case 106 and bottom case 104 can be coupled to ground (signal or chassis) to enhance the performance of the EMI shield.

Although top case 106 and bottom case 104 are formed of conductive material, increasing electrical coupling between top and bottom cases 106, 104 can further enhance shielding properties. In one embodiment, a conductive elastomer can be used to enhance the electrical coupling between top case 106 and bottom case 104 by providing an electrical path through clutch assembly 530.

Figure 6A:
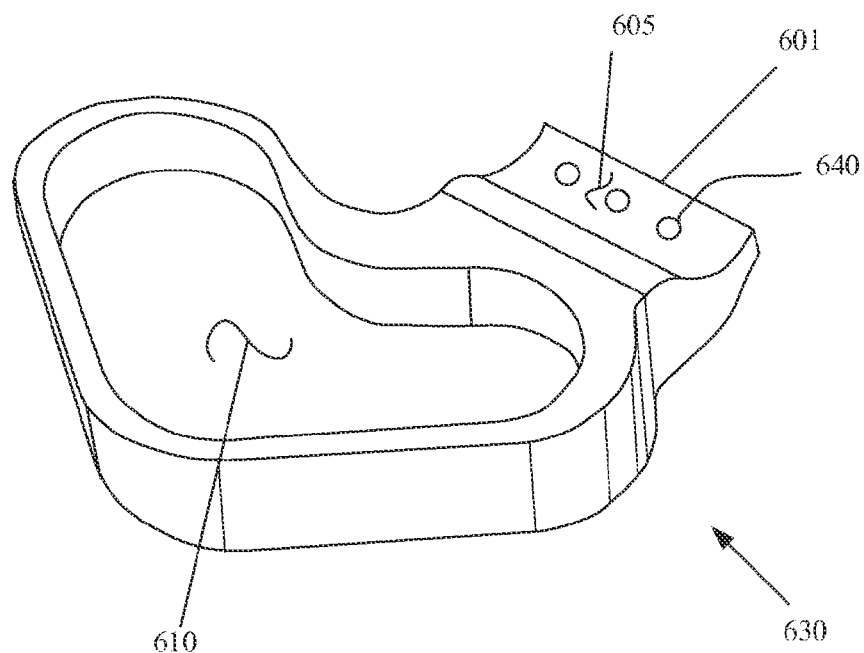
FIGS. 6A-6B are views of an elastomer configured to enhance the electrical coupling between the two piece case of portable computing.
Figure 6B:
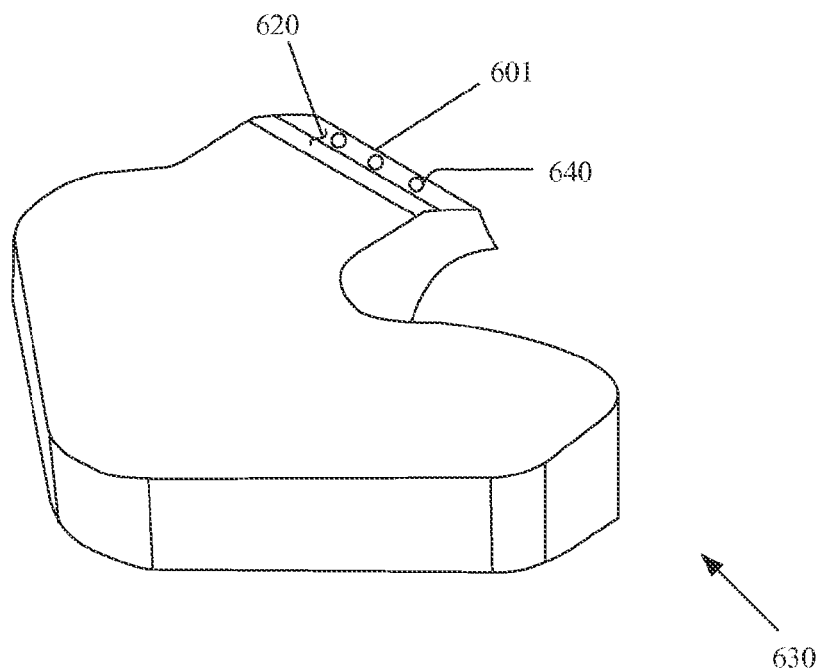

FIGS. 6A-6B are views of an elastomer configured to enhance the electrical coupling between the two piece case of portable computing device 100. In one embodiment, the elastomer can be formed from conductive material. The elastomer can be affixed to one of the case pieces, or to an assembly that is in turn affixed to one of the case pieces. In one embodiment, a conductive elastomer can be formed from a silver loaded silicone. In another embodiment, the conductive elastomer can be formed from styrene, nitrile, neoprene or other compliant material that can be made conductive with an addition silver, copper, aluminum or any other technically feasible material. The selected materials forming the conductive elastomer provide a solid yet compliant elastomer that can deform at least partially when compressed. In one embodiment, the deformation can allow the elastomer to better conform to parts such as the clutch assembly 530 and bottom case 104.

FIG. 6A is a bottom view of one embodiment of a conductive elastomer 630. Conductive elastomer 630 can include a first lobe 601. This embodiment can provide enhanced electrical coupling between top case 106 and bottom case 104. Bottom contact surface 605 is shown on underside of first lobe 601. In one embodiment, the bottom contact surface 605 can be configured to make electrical contract with clutch assembly 530. Conductive elastomer 630 can also include cavity 610 to accommodate mounting screws or other mechanical features near clutch assembly 530. In one embodiment, cavity 610 can include an adhesive to mount and stabilize conductive elastomer 630 with respect to the clutch assembly 530. In one embodiment, conductive elastomer 630 can include one or more highly conductive regions 640 that can form highly conductive pathways from the underside of the first lobe 601 to the top side of first lobe 601. In one embodiment, the highly conductive regions 640 can be formed with ferromagnetic material that can be guided into position with a magnetic field while the conductive elastomer 630 is formed. In another embodiment, a two step molding process can be used to form conductive elastomer 630 including conductive regions 640.

In yet another embodiment, the conductive elastomer 630 can be formed from an elastomer that can be relatively less conductive particularly when conductive elements 640 are disposed on the first lobe 601. FIG. 6B is a top view of conductive elastomer 630. First lobe 601 can include top contact surface 620. Top contact surface 620 can be configured to contact the bottom case 104 when attached to the top case 106. Highly conductive regions 640 are shown disposed on top contact surface 620. In one embodiment, top contact surface 620 can be shaped to closely align with portions of the bottom case 106 that can contact conductive elastomer 630. as described above.

In one embodiment, the conductive elastomer 630 can be affixed to and contact clutch assembly 530. When bottom case 104 is attached to the top case 106, the conductive elastomer can contact bottom case 104, particularly through highly conductive regions 640 enhancing an electrical connection between top case 104 and bottom case 106 in an area near the conductive elastomer. In embodiments where at least one of top case 106 and bottom case 104 are coupled to ground, the conductive elastomer can improve the electrical coupling between top case 106 and bottom case 104 to ground thereby improving EMI shielding, at least in the area of the conductive elastomer.

Figure 7:
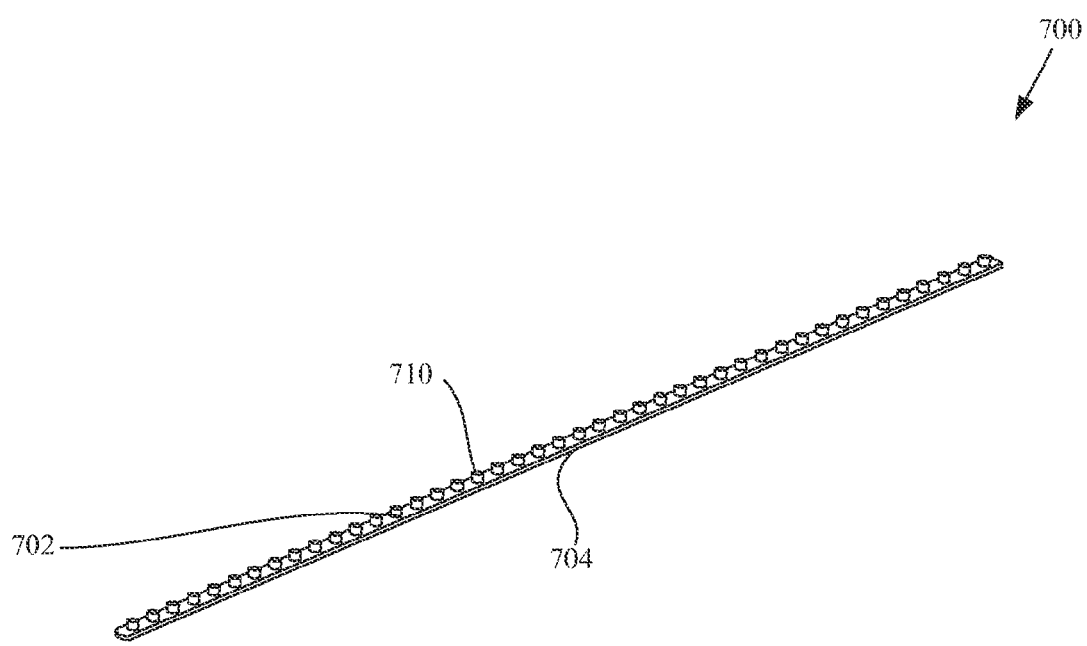
FIG. 7 is an isometric view of a conductive rear gasket configured to enhance electrical conductivity between top case and bottom case in a rear vent region.

FIG. 7 is an isometric view 700 of a conductive rear gasket 702 configured to enhance electrical conductivity between top case 106 and bottom case 104 in rear vent region 420. In one embodiment, rear gasket 702 can include highly conductive elements 710 distributed along a length of rear gasket 702. Highly conductive elements 710 can enhance the electrical conductivity between the top case 106 and the bottom case 104 by providing low resistance electrical pathways. Conductive rear gasket 702 can include an adhesive layer 704 disposed on the underside of the gasket that can be used to affix the gasket 702 to the top case 106. In one embodiment, the highly conductive elements 710 can be formed from ferromagnetic material as described in FIGS. 6A and 6B.

Figure 8A:
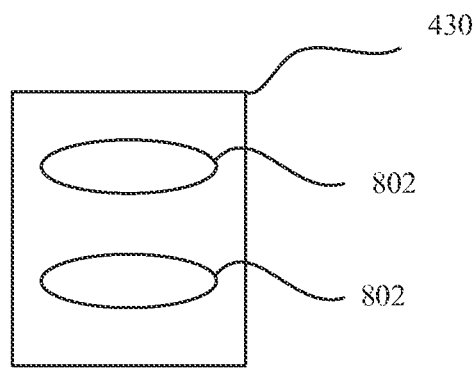
FIGS. 8A-8C illustrate different views and embodiments of a USB ground plate.
Figure 8B:
Figure 8C:
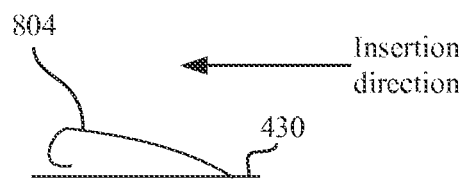

FIGS. 8A-8C illustrate different views and embodiments of USB ground plate 430. The USB ground plate 430 can be configured to contact a USB connector inserted through an opening on a side wall of top case 106 and into a USB receptacle. In some embodiments, the USB receptacle may not include ground contacts that can couple to a ground sheath included in the USB connector. USB ground plate 430 can provide that ground contact path. FIG. 8A is a top view of the USB ground plate 430. The USB ground plate 430 can include one or more contact patches 802 that can be configured to contact at least one portion of the USB connector. The USB ground plate 430 can be formed from a metal such as a sheet metal or any other compliant and conductive material such as copper, aluminum or the like. In another embodiment, the USB ground plate 430 can be formed from a compliant insulator and coated with a conductive coating. USB ground plate 430 can be attached to top case 106 with a conductive adhesive. In one embodiment, if top case 106 is anodized, the anodization layer in the area configured to receive the USB ground plate 430 can be removed. In one embodiment, the anodization layer can be removed by laser ablation.

FIG. 8B is a side view of USB ground plate 430. A profile of contact patch 802 is shown. In one embodiment, the profile of contact patch 802 can be symmetric. When contact patch 802 includes a symmetric profile, the insertion and removal force attributed to USB ground plate 430 can also be symmetric. In one embodiment, the retention force of the USB connector can be determined by the profile of USB ground patch 430. FIG. 8C is a side view of another embodiment of USB ground patch 430. In this embodiment, the contact patches can be realized with spring fingers 804. Spring fingers 804 can be configured to provide an electrical pathway from the top case 106 to the USB connector through a relatively greater distance since the spring fingers 804 are easily configured to compliantly engage over larger distances.

Figure 9:
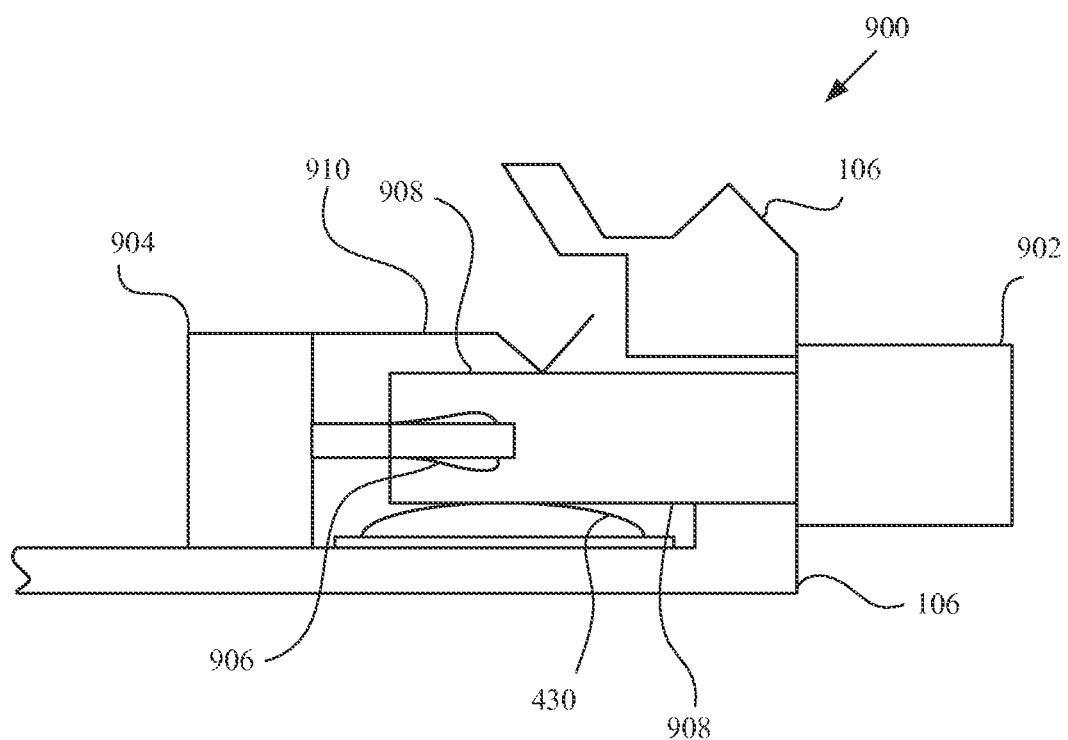
FIG. 9 is a simplified view of one embodiment of a USB connector interacting with a USB ground patch.

FIG. 9 is a simplified view 900 of one embodiment of a USB connector 902 interacting with USB ground patch 430. A USB receptacle 904 can be configured to receive USB connector 902 within top case 106. Portions of the USB receptacle 904 can include contacts 906 that can couple with mating contacts (not shown) that are included in USB connector 902. The USB connector 902 can include a ground sheath 908 that can surround mating contacts in the USB connector 902 and provide an electrical connection to a ground signal and/or shield associated with the USB connector 902. In some embodiments, USB receptacle 904 can include a spring finger ground contact 910 that can contact a portion of ground sheath 908. As shown, spring finger ground contact 910 can contact an upper portion of ground sheath 908. However, in many embodiments, USB receptacle 904 can include no contacts for a lower portion of the ground sheath 908.

USB ground plate 430 can be configured to provide a ground contact path for a lower portion of the ground sheath 908. In one embodiment, the ground plate 430 can be configured to provide an electrical pathway between the USB connector 902 and top case 106.

Figure 10:
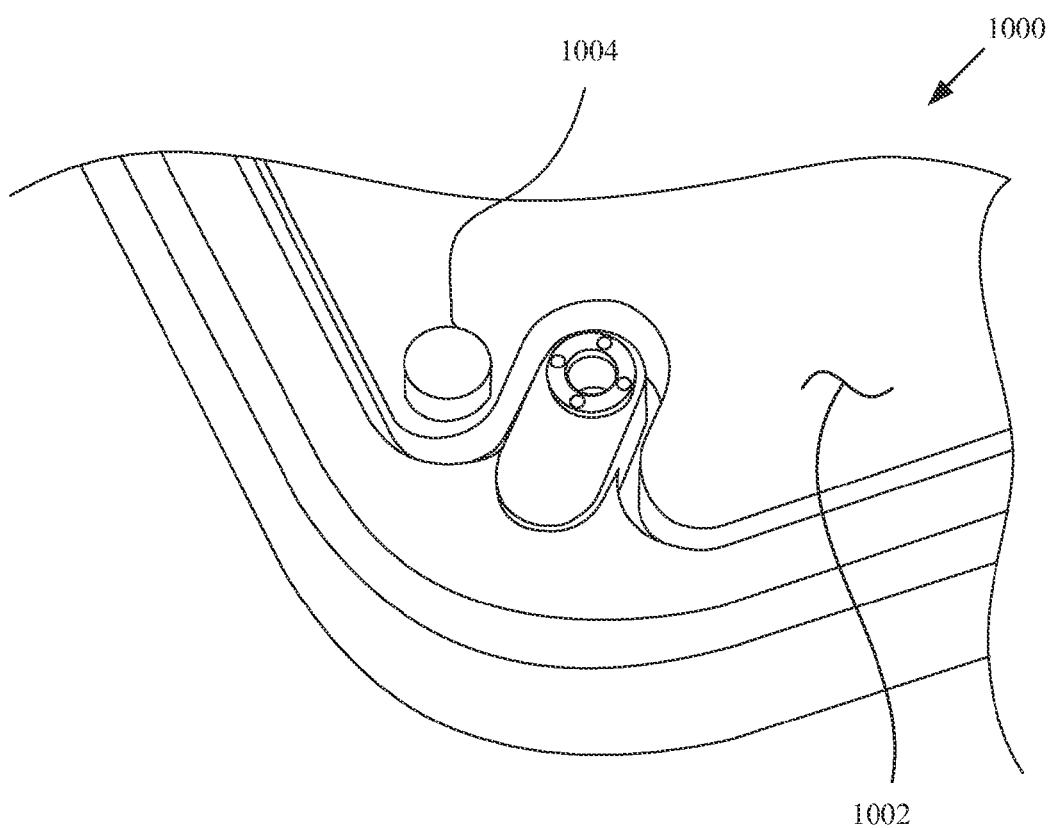
FIG. 10 shows one embodiment of a conductive elastomer configured provide an electrical pathway between top case and bottom case through a speaker mounting screw.

FIG. 10 shows one embodiment 1000 of a conductive elastomer configured provide an electrical pathway between top case 106 and bottom case 104 through a speaker mounting screw. Speaker 1002 can be disposed in speaker region 440 of top case 106. Speaker 1002 can include a mounting screw configured to removably attach speaker 1002 to top case 106. A conductive elastomer 1004 can be configured to contact the mounting screw. In some embodiments, the mounting screw can be inset in a mounting hole in speaker 1002 and the mounting hole can support, at least in part, the conductive elastomer 1004. If bottom case 104 includes a protective coating, such as an anodization coating in the region that contacts conductive elastomer 1004 when bottom case 104 is affixed to top case 106, then the protective coating can be removed in the contact region. In one embodiment, laser ablation can be used to remove the protective coating. Thus, an electrical pathway can be formed from top case 106, through mounting screw, through conductive elastomer 1004 to bottom case 104. The conductive elastomer 1004 can be formed as described in FIGS. 6A and 6B.

Figure 11A:
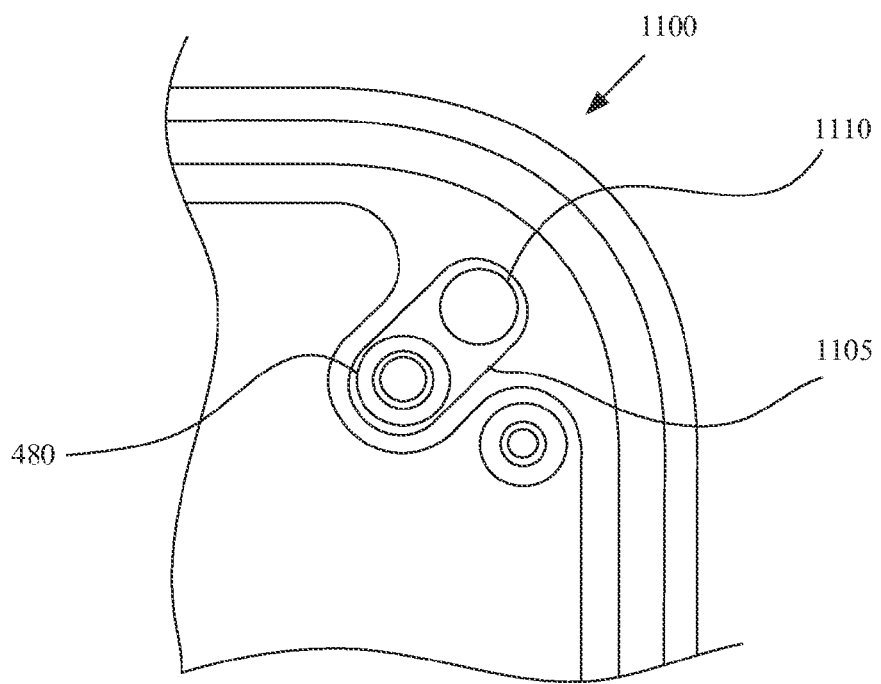
FIGS. 11A and 11B show conductive elastomers configured to integrate with bosses and provide an electrical pathway between top case and bottom case in a region near bosses.
Figure 11B:
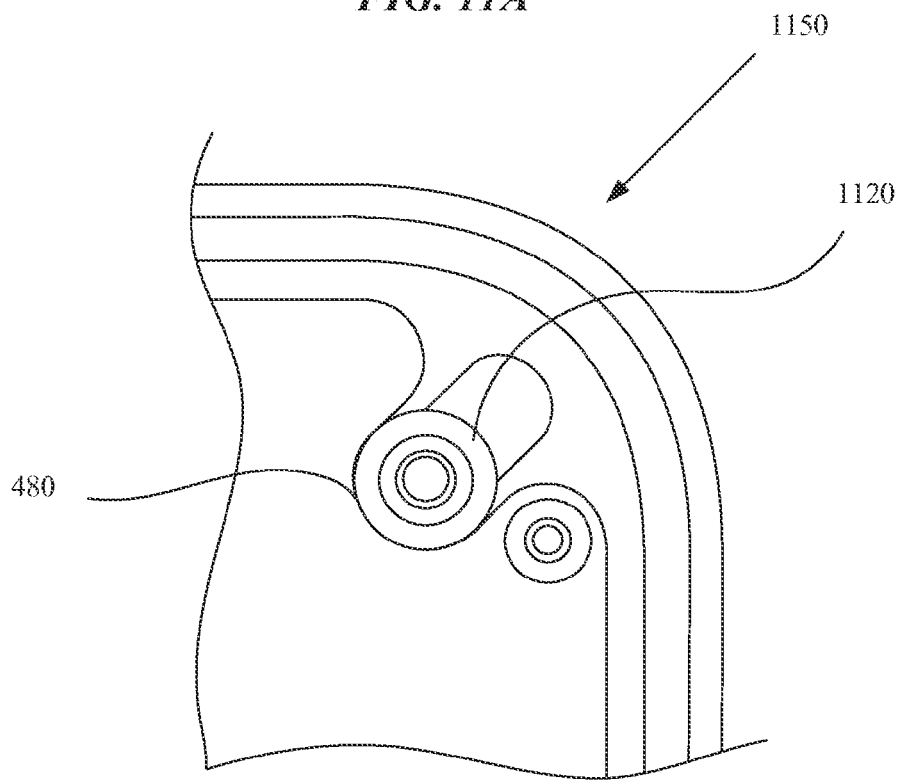

FIGS. 11A and 11B show conductive elastomers configured to integrate with bosses 480 and provide an electrical pathway between top case 106 and bottom case 104 in a region near bosses 480. FIG. 11A shows one embodiment 1100 of a boss-coupled conductive elastomer 1110. Boss 480 can include a surface 1105 that can receive conductive elastomer 1110. In one embodiment, the surface 1105 can be adjacent to an opening in boss 480 configured to receive a fastener. If surface 1105 includes a protective coating, such as an anodization coating, then the protective coating can be removed before the conductive elastomer 1110 is attached. In one embodiment, the conductive elastomer 1110 can be attached to surface 1105 with a conductive adhesive. Conductive elastomer 1110 can be configured to contact a portion of bottom case 104. If bottom case 104 includes a protective coating in the region of contact, the protective coating can be removed to enhance the electrical contact from conductive elastomer 1110.

FIG. 11B is another embodiment 1150 of a boss-coupled conductive elastomer 1120. In this embodiment, conductive elastomer 1120 is configured to surround an opening included in boss 480 that is configured to receive a fastener used to affix the bottom case 104 to the top case 106. In another embodiment, the conductive elastomer 1120 can be affixed to the bottom case 104 and can come into contact with top case 106 when the bottom case 104 is attached to the top case 106. In one embodiment, protective coating in the region of boss 480 configured to receive the conductive elastomer 1020 and protective coating on the bottom case 104 in the region configured to contact the conductive elastomer can be removed to enhance the electrical contact. Conductive elastomers 1110, 1120 can be formed as described above in FIGS. 6A and 6B In the embodiments shown in FIGS. 11A and 11B, the electrical pathway can begin at the top case 106, through conductive elastomer 1110, 1120 to bottom case 104. Conductive elastomers 1110 and 1120 can enhance electrical conductivity between top case 106 and bottom case 104 in an aesthetically pleasing manner by integrating with top case 106 features such as bosses 480. In other embodiments, other features within top case 106 can be used to support conductive elastomers.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A clutch assembly system suitable for pivotally connecting a lid to a base portion of a portable computing device, comprising:
   a cylindrical portion comprising:
      an annular outer region, and
      a central bore region configured to provide support for electrical conductors between the base portion and the lid;
   at least one fastening region configured to couple the clutch assembly to the base portion; and
   an elastomer disposed on the clutch assembly configured to contact the clutch assembly and at least one region of the base portion through conductive pathways formed within the elastomer, wherein the conductive pathways form an electrical path between the clutch assembly and the at least one region of the base portion.

2. The clutch assembly system of claim 1, wherein the conductive pathways include at least one ferromagnetic electrical conductor.

3. The clutch assembly system of claim 1, wherein the elastomer is formed with a two-step molding process.

4. The clutch assembly system of claim 2, wherein the elastomer is formed with a magnetic field configured to position the ferromagnetic material during a molding process.

5. The clutch assembly system of claim 1, wherein the elastomer is formed, at least in part, with a silver loaded silicone.

6. The clutch assembly system of claim 1, wherein the elastomer is configured to attach to the clutch assembly with a conductive adhesive.

7. The clutch assembly system of claim 1, wherein the elastomer is configured to be deformed within the base portion.

8. The clutch assembly system of claim 1, wherein the elastomer further comprises a first lobe configured to include the conductive pathways.

9. The clutch assembly system of 1, wherein the elastomer defines a cavity configured to receive the at least one fastening region.

10. A portable computing device, comprising:
    a lid portion including a display; and
    a base portion pivotally coupled to the lid portion, the base portion comprising:
       a first case and
       a second case coupled to the first case, the second case including at least one boss configured to receive a fastener for securing the first case to the second case, the at least one boss comprising:
       a first conductive surface and
       a conductive elastomer coupled directly to the first conductive surface, wherein when the second case is coupled to the first case, the conductive elastomer is compressed between the first conductive surface and a second conductive surface of the first case such that an electrically conductive pathway is established between the first conductive surface and the second conductive surface.

11. The portable computing device of claim 10, wherein one of the first case and second case is formed, at least in part, from aluminum and includes a protective anodization layer wherein the protective anodization layer is removed from the first or second conductive surface.

12. The portable computing device of claim 11, wherein the anodization layer is removed by laser ablation.

13. The portable computing device of claim 10, wherein the conductive elastomer is affixed to a surface adjacent to a hole configured to receive the fastener.

14. The portable computing device of claim 10, wherein the conductive elastomer is configured to surround a hole configured to receive the fastener.

15. A portable computing device, comprising:
    a lid portion;
    a base portion having a top portion and a bottom portion, the top portion detachably coupled to the bottom portion;
    a clutch assembly configured to pivotally couple the lid portion to the top portion, the clutch assembly comprising:
       a cylindrical portion, and
       a fastening portion configured to couple the clutch assembly to the top portion; and
    an elastomer configured to contact the clutch assembly and the bottom portion through conductive pathways formed within the elastomer, wherein the conductive pathways form an electrical path between the clutch assembly and the bottom portion.

16. The portable computing device of claim 15, wherein the clutch assembly and top portion are conductively coupled and wherein the conductive pathways provide, at least in part, an electrical path between the top portion and the bottom portion.

17. The portable computing device of claim 15, wherein the conductive pathways include a ferromagnetic electrical conductor.

18. The portable computing device of claim 17, wherein the elastomer further comprises a lobe, wherein the ferromagnetic electrical conductor is disposed within the lobe.

19. The portable computing device of claim 17, wherein the ferromagnetic electrical conductor is formed with a magnetic field configured to position the ferromagnetic material during a molding process.

20. The portable computing device of claim 15, wherein the elastomer further comprises a main body defining a cavity configured to receive the fastening portion when the elastomer is in contact with the clutch assembly.

* * * * *

UNITED STATES PATENT AND TRADEMARK OFFICE
CERTIFICATE OF CORRECTION

PATENT NO. : 8,897,007 B2  Page 1 of 1
APPLICATION NO. : 13/865880
DATED : November 25, 2014
INVENTOR(S) : Brandon S. Smith et al.

It is certified that error appears in the above-identified patent and that said Letters Patent is hereby corrected as shown below:

In the Claims:

Column 9, lines 56, 57, 58, and 61 (Claim 1, lines 10, 11, 12, and 15): each occurrence of "clutch assembly" should read --clutch assembly system--.

Column 10, line 8 (Claim 6, line 2): "clutch assembly" should read --clutch assembly system--.

Column 10, line 16 (Claim 9, line 1): "system of 1" should read --system of claim 1--.

Signed and Sealed this
Twenty-first Day of April, 2015

Michelle K. Lee
*Director of the United States Patent and Trademark Office*